United States Patent [19]

Remo et al.

[11] Patent Number: 5,148,438
[45] Date of Patent: Sep. 15, 1992

[54] GAS LASER WITH DISCHARGE IN TWO-DIMENSIONAL WAVEGUIDE

[75] Inventors: John L. Remo, St. James; Gerhard Schaefer, Melville, both of N.Y.

[73] Assignee: Quantametrics Inc., St. James, N.Y.

[21] Appl. No.: 735,173

[22] Filed: Jul. 23, 1991

Related U.S. Application Data

[63] Continuation of Ser. No. 279,674, Dec. 5, 1988, abandoned.

[51] Int. Cl.⁵ .................................. H01S 3/03
[52] U.S. Cl. ............................. 372/37; 372/87
[58] Field of Search ............. 372/37, 55, 58, 59, 372/61, 64, 83, 87

[56] References Cited

U.S. PATENT DOCUMENTS

| | | | |
|---|---|---|---|
| 4,604,752 | 8/1986 | Sequin et al. | 372/29 |
| 4,644,549 | 2/1987 | Oishi | 372/38 |
| 4,715,039 | 12/1987 | Miller et al. | 372/37 |
| 4,755,999 | 7/1988 | Macken | 372/37 |
| 4,849,984 | 7/1989 | Hill | 372/58 |

FOREIGN PATENT DOCUMENTS 58-46687  3/1983  Japan .................. 372/59

OTHER PUBLICATIONS

Lasers & Optronics, May 1988, pp. 19 and 20.

Primary Examiner—Frank Gonzalez
Attorney, Agent, or Firm—Stanger, Michaelson, Spivak & Wallace

[57] ABSTRACT

In the disclosed laser system, electrodes establish discharge channels between and parallel to the surfaces of an open two-dimensional waveguide. An optical resonator forms an axis transverse to the channels between the surfaces. An electromagnetic arrangement forms an alternating magnetic field transverse to the discharges and the axis to produce a back-and-forth magnetic force on the discharge current flow and create a time-average homogeneity of the discharge in the waveguide cavity. A circulating arrangement cools and circulates laser gas through the cavity parallel to the discharge channels.

43 Claims, 2 Drawing Sheets

GAS LASER WITH DISCHARGE IN TWO-DIMENSIONAL WAVEGUIDE

This is a continuation of application Ser. No. 279,674, filed Dec. 5, 1988 (now abandoned).

BACKGROUND OF THE INVENTION

This invention relates to gas lasers, and particularly gas lasers using a gas discharge in a waveguide as the laser medium.

A gas laser is operated by creating a discharge in a gas within an optical resonator. The discharge causes an overpopulation of upper energy levels within the gas, and the subsequent transition to lower energy levels releases light at discrete frequencies within the resonator to maintain lasing action. In a typical gas laser, a hollow tube confines the discharge between the mirrors of the optical resonator.

Portable gas laser systems require small rugged lasers having large specific power, namely high power per laser mass or laser volume. An important step in increasing the specific power of continuous wave gas lasers was the development of a waveguide gas laser that works in discharge tubes with circular or rectangular cross sections on the order of one square millimeter. However, several factors limit the specific power of such lasers. The power per discharge tube length is limited and does not significantly differ from conventional large bore lasers. Also, the top and side walls of the waveguide, and the optical resonator at the ends, limits the opportunities for cooling the laser.

An article in *Lasers and Optronics*, May 1988, pages 19 and 20, describes a laser system in which a two-dimensional waveguide confines the discharge. Here, the author generates a multiplicity of parallel discharges within a rectangular cavity with a series of cathodes along one edge of the waveguide and a series of anodes along the other. The author states that if the cavity were merely filled with a laser gas mixture, a DC discharge would not uniformly fill the cavity. It would "neck down" to several discrete discharge channels. A constant magnetic field applied perpendicular to the plane of the cavity would force the discrete discharges to sweep through the cavity and deplete electrons from one end of the cavity and cause termination of the discharge at the other end. To overcome this disadvantage, a "launcher" in the form of an extended anode that lies on the surface of the cavity increases the electric field strength in the area of the cavity that must continuously initiate new electrical charges. These new electrical charges offset the magnetic forces that sweep the discharges through the cavity. With sufficient magnetic field strength, a transition occurs from discrete moving discharges to a homogeneous and uniform discharge. Laser action occurs during this homogeneous and uniform discharge.

However, operation of such a waveguide laser depends upon several factors, including gas pressure, current density, and electrode configuration to obtain the required homogeneity. This creates a cumbersome interrelationship of operational factors which limit the applicability of this device.

OBJECTS AND SUMMARY OF THE INVENTION

An object of the invention is to overcome disadvantages of prior gas lasers.

Another object of the invention is to improve gas lasers.

The invention furnishes a waveguide laser having a two-dimensional waveguide, namely one with open sides and ends. Means establish a discharge within the cavity of the two-dimensional waveguide and between an optical resonator, and move the discharge spatially back and forth within the cavity so as to increase the time-average homogeneity of the discharge within the cavity.

According to another feature of the invention, the back and forth movement is achieved magnetically, preferably with an electro-magnetic device for producing an alternating magnetic field transverse to the direction of the discharge. For convenience, the magnetic field alternates at 50 Hz or 60 Hz, although other frequencies are contemplated by the invention.

According to another feature of the invention, an anode-cathode system outside the cavity produces discharges within the cavity, parallel to the surfaces of the waveguide, and transverse to the optical axis of the optical resonator.

According to yet another feature of the invention, a cooling system convectively cools the gas in the cavity along the direction of the discharge.

These and other features of the invention are pointed out in the claims. Other objects and advantages of the inventions will become evident from the following detailed description when read in light of the accompanying drawings.

DETAILED DESCRIPTION OF PREFERRED EMBODIMENTS

Figure 1:
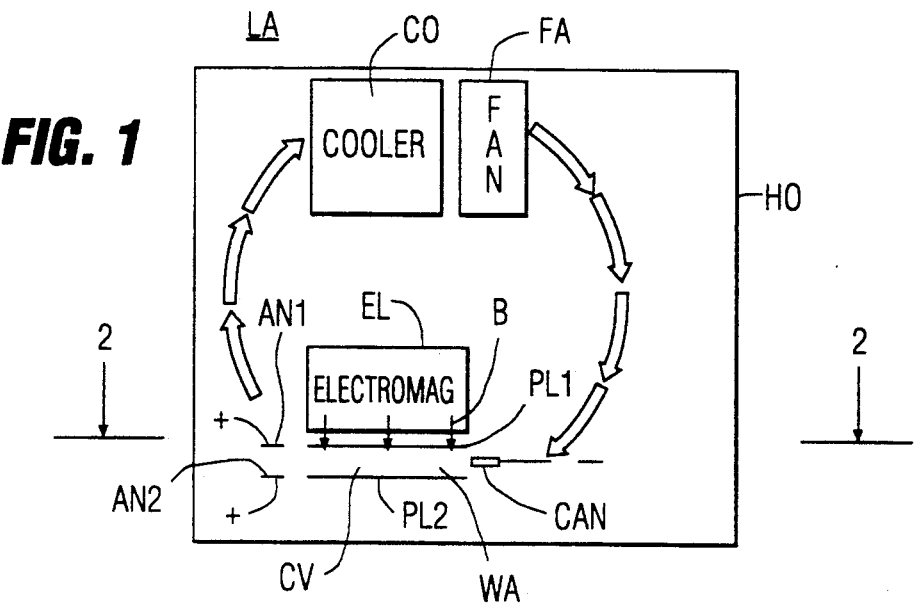
FIG. 1 is a partially schematic elevational section of a laser, embodying features of the invention.
Figure 2:
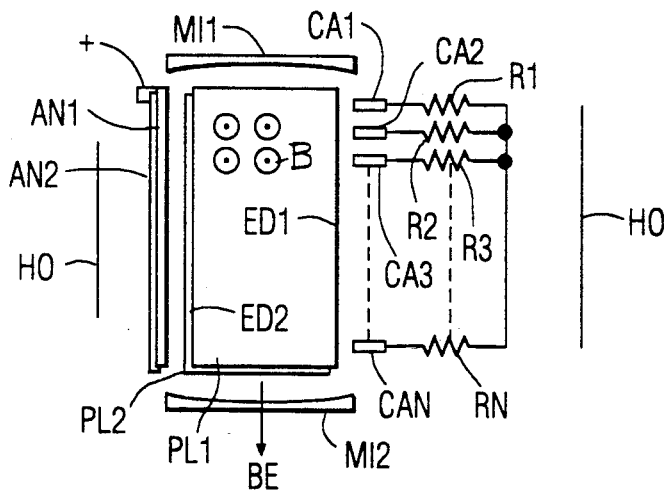
FIG. 2 is a partially schematic section 2—2 of FIG. 1, showing a plan view of the waveguide the discharge mechanism, and optical resonator.
Figure 3:
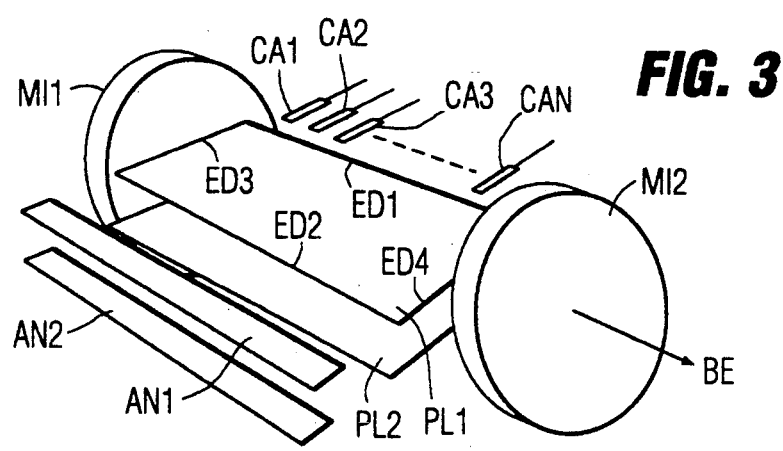
FIG. 3 is a partially schematic, and somewhat exploded, or perspective view of the waveguide, discharge mechanism, and optical resonator in FIGS. 1 and 2.

In FIGS. 1, 2 and 3, a housing HO of a gas laser LA internally supports a waveguide WA composed of parallel plates PL1 and PL2 spaced from each other to form a cavity CV. A multiplicity of pin-shaped cathodes CA1, CA2, ... CAN connect via resistors R1, R2, ... RN to a negative potential and align along the one edge ED1 of the plates P11 and PL2. The cathodes CA1 to CAN project toward the center of the cavity CV. A pair of anode plates AN1 and AN2 extending along the opposite edges ED2 of the plates PL1 and PL2 connect to a sufficiently high positive potential relative to the potential of cathodes CA1 to CAN to initially produce discharge breakdown of the laser gas in the cavity CV. When the high potential energizes the anodes AN1, AN2 and cathodes CA1, CA2, ... CAN, breakdown occurs, the anode to cathode potential drops, and the anodes and cathodes maintain continuous discharges in the cavity CV. The discharges are in the form of continuous elongated plasma channels between the anodes AN1, AN2 and the cathodes to CA1, CA2, ... CAN. According to an embodiment of the invention, the laser gas is carbon-dioxide According to other embodiments, other known laser gases, or combinations of gases, are used.

The housing HO hermetically seals the laser gas or gases within its interior and maintains the laser gas at a predetermined pressure. A cooler CO, a fan FA, and a series of baffles (not shown) cool the laser gas and circulate the gas within the housing HO into and out of the cavity CV parallel to the discharge path between the anodes AN1, AN2 and cathodes CA1, CA2, ... CAN. This convectively cools the gas in the cavity CV. An electromagnet arrangement EL furnishes a magnetic field transverse to the plates PL1 and PL2. A source, not shown, connected to the electromagnet arrangement EL alternates the electromagnetic field at a frequency of 50 or 60 Hz. These frequencies are only examples. One may use other frequencies. Also the electromagnetic arrangement EL may extend under the plates PL1 and PL2 to control the field more completely.

A pair of spherically concave mirrors MI1 and MI2 facing each other across the cavity CA form an optical resonator with the cavity CA. The mirrors MI1 and MI2 have widths approximately equal to the edges ED3 and ED4 of the plates PL1 and PL2. According to the embodiment shown in FIG. 4, which is identical to that of FIG. 2, except for the mirrors, the optical resonator includes opposing concave cylindrical mirrors MI3 and MI4 whose cylindrical faces are cylindrical about axes transverse to the plane of the plates PL1 and PL2. The mirrors MI2 and MI4 are partly transparent to emit a beam BE.

For clarity, FIG. 2 illustrates the plate PL2 and the anode AN2 as sticking out behind the plate PL1 and anode AN1. However, this is done only for ease of understanding, and it should be recognized that the plate PL1 is identical to the plate PL2 and overlies that plate completely, while the anode AN1 is identical to the anode AN2 and overlies that anode completely.

Figure 4:
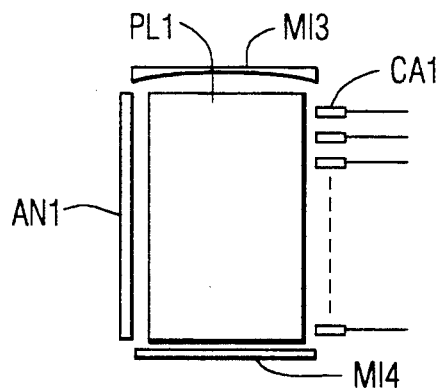
FIG. 4 is a plan view of a waveguide, discharge mechanism, and optical resonator for use in the system of FIGS. 1, 2 and 3, according to another embodiment of the invention.
Figure 5:
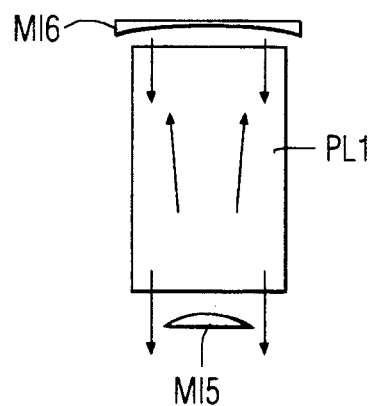
FIG. 5 is a view of the waveguide and optical resonator of another embodiment of the invention for use in the laser of FIG. 1.

FIG. 5 illustrates another waveguide identical to the waveguide in FIGS. 1–4 in a laser as shown in FIG. 1, but with a different type of optical resonator. Here, a smaller convex mirror MI5 faces a larger concave mirror MI6 through the cavity CA. The resonator works as an unstable resonator; it couples the light that emerges from outside the ends of the mirror MI5.

Figure 6:
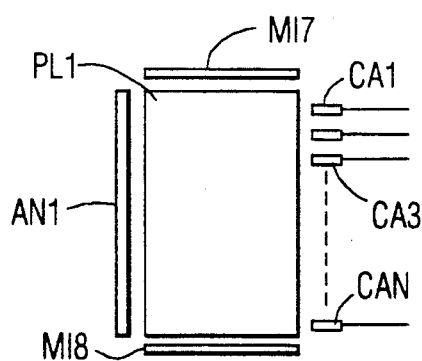
FIG. 6 is a view of the waveguide, discharge mechanism, and optical resonator of another embodiment of the invention for use in the laser of FIGS. 1, 2 and 3.

FIG. 6 illustrates another embodiment identical to that shown in FIGS. 1 to 5, except that the resonator has flat mirrors MI7 and MI8. This represents the case of the radius of curvature of the mirrors being infinite.

The structure of the invention combines the operational characteristics of an open resonator, i.e. in the plane between and parallel to the plates PL1 and PL2, and a waveguide resonator, i.e. in planes perpendicular the plates PL1 and Pl2.

According to one embodiment of the invention, the waveguide plates PL1 and PL2 have dimensions of ten centimeters between the mirrors of the optical resonator and one centimeter along the discharge path between cathodes and anodes, while separated from each other by 0.1 millimeter. According to another embodiment of the invention, the plates have the same dimensions but are separated from each other by one millimeter.

According to yet another embodiment of the invention, the plates are one meter along the optical resonator, and 10 centimeters along the discharge between the electrodes, while being separated from each other by one centimeter.

In operation, suitable means introduce the laser gas into the housing Ho and establish a desired gas pressure. The fan FA then begins to circulate the gas through the cavity CV and the cooler CO cools the gas. A high voltage depending on the gas and the gas pressure is applied between the anodes AN1, AN2 and the cathodes CA1 to CAN. This initial voltage produces a breakdown and then a maintenance voltage is established between the pin cathodes CA1 to CAN and the anodes AN1, AN2. At the maintenance potential, individual plasma channels maintain themselves between each of the pin cathodes CA1 to CAN and the anodes AN1, AN2.

With the application of the initial voltage to the anodes and cathodes, the electromagnet EL establishes an alternating 50 Hz or 60 Hz magnetic field transverse to the waveguide WA. The alternating magnetic field passing through the cavity CV applies an alternating force upon the current carrying channels transverse to both the current and the magnetic field. The force of the alternating magnetic field moves the discharge channels first in one direction and then the other during each cycle. This creates a time-average homogeneity of the plasma within the cavity sufficient to support laser action.

The structure composed of the plates PL1 and PL2 and mirrors MI1 and MI2, MI3 and MI4, MI5 and MI6, MI7 and MI8 of FIGS. 1 to 6 fulfills the requirements for the field distribution which are in fact different in two different directions. The field distribution in the plane defined by the optical resonator axis and the spacing between the two plates, (parallel to the magnetic field,) defines waveguide modes similar to those of hollow waveguide lasers. On the other hand, the field distribution within and parallel to the waveguide plates PL1 and PL2 defines the modes of an open resonator configuration. The coupling losses between the waveguide and the free space are made sufficiently small by placing the mirrors MI1 and MI2 directly at the ends of the waveguide. In this case, the coupling losses for the lowest order waveguide mode can be kept minimal. Diffraction losses for this resonator are small while the mode volume is large. A resonator with large radii reflectors enhances the stability of such a system with respect to small misalignments and perturbations.

The resonators of FIGS. 3, 4, and 5 determine the mode structure. According to one embodiment of the invention, the system operates as a stable resonator with a large radius of curvature. According to another embodiment usable with high power applications, the system operates as an unstable resonator.

The use of waveguides according to the invention offers a number of advantages. The independence of width and distance of the two-dimensional waveguide WA adds an additional parameter for the choice of an optimum geometry. It also allows a transverse convection flow without disturbing the waveguide properties. It is thus possible to flow the gas through the waveguide transverse to the resonator axis. This allows combining the special properties of a waveguide laser with convection cooling to allow a much higher power output into the discharge volume and yield a much greater gain. The resonator serves as a waveguide resonator for one transverse coordinate and as a free space resonator for the other transverse coordinate.

According to an embodiment of the invention, the pressure of the gas within the housing is established to produce a predetermined line width for the output frequency range. That is, the higher the pressure, the greater the line width. Since each laser can produce several lines, an increase in the line widths allows adjacent lines to merge with each other and results in an output over a continuous frequency band. This permits the laser to be tuned with a diffraction grating instead of the mirrors.

For some applications, it is desirable to shift from one frequency to another on a continuous basis. The convection cooling of the invention allows the pressure between the plates to increase to a value hitherto unavailable by confined laser tubes. The cooling is a feature which enhances gain, something necessary for tunability of the laser.

The separate ballasted pin electrodes CAI to CAN concentrate the discharge into a few stable channels and the alternating magnetic field transverse to the plates swings the channels back and forth so as to produce a time-average homogeneity. The frequency of the magnetic field need not vary at 50 Hz or 60 Hz but may be at other frequencies, especially higher frequencies.

Figure 7:
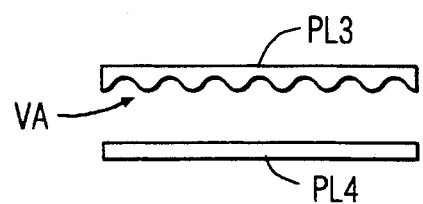
FIG. 7 is a sectional elevation of another waveguide for use in the laser of FIGS. 1, 2, and 3.

The present invention also allows applying special configurations to the interior faces of the waveguide plates PL1 and PL2. The plate structure allows easy manufacture of any optical properties on the inner walls of the waveguide, such as distributed reflectivity, distributed feedback, and distributed coupling. FIG. 7 shows two plates PL3 and PL4 for use in the environment of FIGS. 1 to 6. Here, a periodic structure composed of variations VA on one plate PL3, having a relation to the beam, such as one-half wavelength, makes possible the elimination of the mirrors of the optical resonators. The periodic structure may also be periodic within an envelope.

The invention affords a rugged, efficient, and reliable gas laser with high specific power. It permits high energy density in the gain region, i.e., in the cavity, that allows tuning within a broadened line or merging broadened lines, and is especially valuable for applications that require tuning. Other applications for the invention include lidar microsurgery and materials processing.

The present invention allows the introduction of a transverse flow without interfering with waveguide properties. It also permits optimization of resonator geometry through the independent parameters of length and width. The time-average homogeneity in the laser plasma introduced by the external field supports a high pressure operation.

The invention permits operation at very high power densities and is inherently rugged and reliable while operating at a high efficiency. It overcomes the disadvantage of wall-stabilized discharges. In the latter, decreasing the tube diameter results in an increase of gain and an increase of the power extracted per volume, but also results in a reduction of the volume and hence limits the total power. The invention avoids this effect.

As compared to prior open waveguide devices, the present invention creates discharge channels which do not die out and need not be relaunched. The motion of the discharge channels is substantially controlled.

While embodiments of the invention have been described in detail, it will be evident to those skilled in the art that these are only illustrative and that the invention may be otherwise embodied.

What is claimed is:

1. A gas laser, comprising:
a structure forming a pair of substantially parallel surfaces facing each other and defining a space between the surfaces;
said structure including an optical resonating arrangement having an optical axis parallel to and between the surfaces;
control means for producing a discharge between the surfaces and for causing the discharge to move back and forth within the space;
said resonating arrangement including an active medium and forming a resonant cavity with said medium;
said structure including means for containing said medium and pumping means; and
said control means including energy abstracting means.

2. A gas laser as in claim 1, wherein said control means includes magnetic means for producing the back and forth movement of the discharge.

3. A gas laser as in claim 1, wherein said control means includes electromagnetic means for producing an alternating magnetic field transverse to the direction of the discharge.

4. A gas laser as in claim 1, wherein said control means includes means for producing the discharge along a direction substantially parallel to the surfaces.

5. A gas laser as in claim 1, wherein said control means includes means for producing the discharge along a direction substantially transverse to the optical axis.

6. A gas laser as in claim 1, wherein said control means includes means for causing the discharge to move back and forth within the space transverse to the direction of discharge.

7. A gas laser as in claim 1, wherein said control means includes anode-cathode means for producing a discharge within the space between the surfaces and parallel to the surfaces and transverse to the optical axis.

8. A gas laser as in claim 2, wherein said control means includes means for producing the discharge along a direction substantially parallel to the surfaces.

9. A gas laser as in claim 2, wherein said control means includes means for producing the discharge along a direction substantially transverse to the optical axis.

10. A gas laser as in claim 2, wherein said control means includes means for causing the discharge to move back and forth within the space transverse to the direction of discharge.

11. A gas laser as in claim 3, wherein said control means includes means for producing the discharge along a direction substantially transverse to the optical axis.

12. A gas laser as in claim 3, wherein said control means includes means for causing the discharge to move back and forth within the space transverse to the direction of discharge.

13. A gas laser as in claim 1, wherein said surfaces have boundaries and define the limits of the space between the boundaries and said control means includes anode-cathode means located outside of the space between the surfaces for producing a discharge within the space between the surfaces and parallel to the surfaces and transverse to the optical axis.

14. A gas laser as in claim 2, wherein said surfaces have boundaries and define the limits of the space between the boundaries and said control means includes an anode-cathode means located outside of the space between the surfaces for producing a discharge within the space between the surfaces and parallel to the surfaces and transverse to the optical axis.

15. A gas laser as in claim 3, wherein said surfaces have boundaries and define the limits of the space between the boundaries and said control means includes anode-cathode means located outside of the space between the surfaces for producing a discharge within the space between the surfaces and parallel to the surfaces and transverse to the optical axis.

16. A gas laser as in claim 1, wherein said surfaces have boundaries and define the limits of the space between the boundaries, said control means includes anode-cathode means located outside of the space, and said anode-cathode means includes a plurality of cathode rods outside the space and directed toward the space and an anode outside the space opposite the boundaries.

17. A gas laser as in claim 2, wherein said surfaces have boundaries and define the limits of the space between the boundaries, said control means includes anode-cathode means located outside of the space, and said anode-cathode means includes a plurality of cathode rods outside the space and directed toward the space and an anode outside the space opposite the boundaries.

18. A gas laser as in claim 3, wherein said surfaces have boundaries and define the limits of the space between the boundaries, said control means includes anode-cathode means located outside of the space, and said anode-cathode means includes a plurality of cathode rods outside the space and directed toward the space and an anode outside the space opposite the boundaries.

19. A gas laser as in claim 1, wherein said surfaces have rectangular overlying boundaries and define a cubic volume for the space between the boundaries, said control means includes anode-cathode means located outside of the space, and said anode-cathode means includes a plurality of cathode rods outside the space and arranged along a locus between a first rectangular boundary of one surface and the overlying first rectangular boundary of the other surface and directed toward the space, and a pair of anode plates outside the space along the rectangular boundaries opposite the first rectangular boundaries.

20. A gas laser as in claim 2, wherein said surfaces have rectangular overlying boundaries and define a cubic volume for the space between the boundaries, said control means includes an anode-cathode means located outside of the space, and said anode-cathode means includes a plurality of cathode rods outside the space and arranged along a locus between a first rectangular boundary of one surface and the overlying first rectangular boundary of the other surface and directed toward the space, and a pair of anode plates outside the space along the rectangular boundaries opposite the first rectangular boundaries.

21. A gas laser as in claim 3, wherein said surfaces have rectangular overlying boundaries and define a cubic volume for the space between the boundaries, said control means includes anode-cathode means located outside of the space, and said anode-cathode means includes a plurality of cathode rods outside the space and arranged along a locus between a first rectangular boundary of one surface and the overlying first rectangular boundary of the other surface and directed toward the space, and a pair of anode plates outside the space along the rectangular boundaries opposite the first rectangular boundaries.

22. A gas laser as in claim 1, wherein said optical resonating arrangement includes a pair of opposing mirrors, one of said mirrors being partially transparent.

23. A gas laser as in claim 3, wherein said optical resonating arrangement includes a pair of opposing mirrors, one of said mirrors being partially transparent.

24. A gas laser as in claim 15, wherein said optical resonating arrangement includes a pair of opposing mirrors, one of said mirrors being partially transparent.

25. A gas laser as in claim 18, wherein said optical resonating arrangement includes a pair of opposing mirrors, one of said mirrors being partially transparent.

26. A gas laser as in claim 21, wherein said optical resonating arrangement includes a pair of opposing mirrors, one of said mirrors being partially transparent.

27. A gas laser as in claim 1, wherein said optical resonating arrangement includes a pair of opposing flat mirrors, one of said mirrors being partially transparent.

28. A gas laser as in claim 3, wherein said optical resonating arrangement includes a pair of opposing concave spherical mirrors, one of said mirrors being partially transparent.

29. A gas laser as in claim 21, wherein said optical resonating arrangement includes a pair of opposing concave spherical mirrors, one of said mirrors being partially transparent.

30. A gas laser as in claim 1, wherein said optical resonating arrangement includes a pair of opposing concave cylindrical mirrors curved about an axis transverse to the surfaces, one of said mirrors being partially transparent.

31. A gas laser as in claim 3, wherein said optical resonating arrangement includes a pair of opposing concave cylindrical mirrors curved about an axis transverse to the surfaces, one of said mirrors being partially transparent.

32. A gas laser as in claim 21, wherein said optical resonating arrangement includes a pair of opposing concave cylindrical mirrors curved about an axis transverse to the surfaces, one of said mirrors being partially transparent.

33. A gas laser as in claim 1, wherein said optical resonating arrangement includes a pair of opposing mirrors, one of said mirrors being concave relative to said space and the other being convex and coaxial with the concave mirror, said concave mirror being larger than the convex mirror.

34. A gas laser as in claim 3, wherein said optical resonating arrangement includes a pair of opposing mirrors, one of said mirrors being concave relative to said space and the other being convex and coaxial with the concave mirror, said concave mirror being larger than the convex mirror.

35. A gas laser as in claim 21, wherein said optical resonating arrangement includes a pair of opposing mirrors, one of said mirrors being concave relative to said space and the other being convex and coaxial with the concave mirror, said concave mirror being larger than the convex mirror.

36. A gas laser as in claim 29, wherein said mirrors are located along opposite rectangular edges of said surfaces.

37. A gas laser as in claim 32, wherein said mirrors are located along opposite rectangular edges of said surfaces.

38. A gas laser as in claim 35, wherein said mirrors are located along opposite rectangular edges of said surfaces.

39. A gas laser as in claim 1, wherein said structure includes a housing surrounding said resonating arrangement and said control means and means.

40. A gas laser as in claim 21, wherein said structure includes a housing surrounding said resonating arrangement and said control means and means for circulating and cooling gas in the space.

41. A gas laser as in claim 36, wherein said structure includes a housing surrounding said resonating arrangement and said control means and means for circulating and cooling gas in the space.

42. A gas laser as in claim 39, wherein said means for circulating and cooling gas includes fan means to circulate said gas in a direction along the discharge.

43. A gas laser as in claim 40, wherein said means for circulating and cooling gas includes a fan means to circulate said gas in a direction along the discharge.

* * * * *